(12) United States Patent
Fujii et al.

(10) Patent No.: US 10,948,120 B2
(45) Date of Patent: Mar. 16, 2021

(54) HEAT INSULATING SHEET

(71) Applicant: Panasonic Intellectual Property Management Co., Ltd., Osaka (JP)

(72) Inventors: Takeshi Fujii, Osaka (JP); Kazushige Koyama, Hokkaido (JP); Yuuichi Abe, Hokkaido (JP); Rikako Shono, Hokkaido (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/313,175

(22) PCT Filed: Jun. 23, 2017

(86) PCT No.: PCT/JP2017/023119
§ 371 (c)(1),
(2) Date: Dec. 26, 2018

(87) PCT Pub. No.: WO2018/029997
PCT Pub. Date: Feb. 15, 2018

(65) Prior Publication Data
US 2019/0154188 A1 May 23, 2019

(30) Foreign Application Priority Data
Aug. 9, 2016 (JP) .............................. JP2016-156195

(51) Int. Cl.
*B32B 3/30* (2006.01)
*B32B 5/24* (2006.01)
(Continued)

(52) U.S. Cl.
CPC .............. *F16L 59/029* (2013.01); *B32B 5/24* (2013.01); *D04H 1/413* (2013.01); *F16L 59/026* (2013.01);
(Continued)

(58) Field of Classification Search
CPC ...... Y10T 428/24479; Y10T 428/24612; Y10T 428/2457; Y10T 428/24314; F16L 59/029;
(Continued)

(56) References Cited

U.S. PATENT DOCUMENTS 5,565,049 A * 10/1996 Simmons ............... B29C 70/508
156/212
9,605,427 B2 * 3/2017 Besselievre ........... C04B 28/005
(Continued)

FOREIGN PATENT DOCUMENTS

JP 2011-136859 7/2011
JP 2014-095426 5/2014
(Continued)

OTHER PUBLICATIONS

International Search Report of PCT application No. PCT/JP2017/023119 dated Sep. 19, 2017.

*Primary Examiner* — Joanna Pleszczynska
(74) *Attorney, Agent, or Firm* — McDermott Will and Emery LLP

(57) ABSTRACT

An object is to provide a heat insulating sheet that is easily attachable even if a size is increased, and to provide a method for manufacturing the same. A heat insulating sheet includes nonwoven fabric, and heat insulating body carrying xerogel in a space inside nonwoven fabric. Heat insulating body includes first region carrying the xerogel, and second region not carrying the xerogel and provided inside an outer periphery of heat insulating body. The heat insulating sheet is configured such that each of both surfaces of heat insulating body is provided with protective sheet, and in a periphery of heat insulating body and in second region, protective sheets are mutually joined or protective sheets and second region are joined.

6 Claims, 5 Drawing Sheets

(51) Int. Cl.
  *B32B 7/04*   (2019.01)
  *F16L 59/02*  (2006.01)
  *F16L 59/06*  (2006.01)
  *D04H 1/413*  (2012.01)
  *C01B 33/16*      (2006.01)
  *B32B 7/05*       (2019.01)
  *B32B 7/027*      (2019.01)
  *B32B 5/26*       (2006.01)
  *B32B 27/08*      (2006.01)
  *B32B 27/36*      (2006.01)
  *D04H 1/4218*     (2012.01)

(52) U.S. Cl.
  CPC ............. *F16L 59/028* (2013.01); *F16L 59/06* (2013.01); *B32B 3/30* (2013.01); *B32B 5/26* (2013.01); *B32B 7/027* (2019.01); *B32B 7/05* (2019.01); *B32B 27/08* (2013.01); *B32B 27/36* (2013.01); *B32B 2260/046* (2013.01); *B32B 2262/101* (2013.01); *B32B 2307/304* (2013.01); *C01B 33/16* (2013.01); *D04H 1/4218* (2013.01)

(58) Field of Classification Search
  CPC .......... F16L 59/06; F16L 59/026; B32B 5/24; B32B 7/05; B32B 7/027; B32B 3/30; B32B 2307/304; B32B 3/266
  See application file for complete search history.

(56) References Cited

U.S. PATENT DOCUMENTS

2006/0228971 A1\* 10/2006 Bridges .................... B32B 3/30
  442/382
2008/0095970 A1\* 4/2008 Takashima ............ F16L 59/065
  428/69
2016/0302507 A1\* 10/2016 Lewis ..................... B32B 5/022

FOREIGN PATENT DOCUMENTS

JP  2014-237910  12/2014
WO  2016/084763  6/2016

\* cited by examiner

HEAT INSULATING SHEET

This application is a U.S. national stage application of the PCT International Application No. PCT/JP2017/023119 filed on Jun. 23, 2017, which claims the benefit of foreign priority of Japanese patent application No. 2016-156195 filed on Aug. 9, 2016, the contents all of which are incorporated herein by reference.

FIELD OF THE INVENTION

The present disclosure relates to a heat insulating sheet used for heat insulation, and a method for manufacturing the same.

DESCRIPTION OF THE RELATED ART

In recent years, strong appeals have been made for saving energy. To realize it, there is a method of improving energy efficiency by retaining heat in a device. In order to realize such heat retention, a heat insulating sheet having excellent heat insulating effect is demanded. Accordingly, there is a case of using a heat insulating sheet having lower thermal conductivity than that of the air by allowing a nonwoven fabric to carry silica xerogel.

As citation list information related to this technology, Patent Literature 1 has been known, for example.

CITATION LIST

Patent Literature

PTL 1: Unexamined Japanese Patent Publication No. 2011-136859

SUMMARY OF THE INVENTION

However, the heat insulating sheet described above has low adhesiveness. Further, as silica xerogel is likely to be separated, a protective sheet is required. Moreover, when the size of a heat insulating sheet is increased, it is difficult to fix the heat insulating sheet.

An object of the present disclosure is to provide a heat insulating sheet that is easily attachable even if the size is increased, and to provide a method for manufacturing the same.

In order to solve the problem described above, according to the present disclosure, a heat insulating sheet includes a nonwoven fabric, and a heat insulating body carrying xerogel in a space inside the nonwoven fabric. The heat insulating body includes a first region carrying the xerogel, and a second region not carrying the xerogel and provided inside an outer periphery of the heat insulating body. The heat insulating sheet is configured such that each of both surfaces of the heat insulating sheet is provided with a protective sheet, and that the protective sheets are mutually joined in a periphery of the heat insulating body and the protective sheets and the nonwoven fabric are joined in the second region.

With the configuration described above, it is possible to obtain a heat insulating sheet sealed to prevent silica xerogel from being separated, capable of being welded to a casing or the like in the second region, and having excellent attachability.

DETAILED DESCRIPTION OF THE PREFERRED EMBODIMENTS

Hereinafter, heat insulating sheets of exemplary embodiments of the present disclosure will be described with reference to the drawings.

First Exemplary Embodiment

Figure 1:
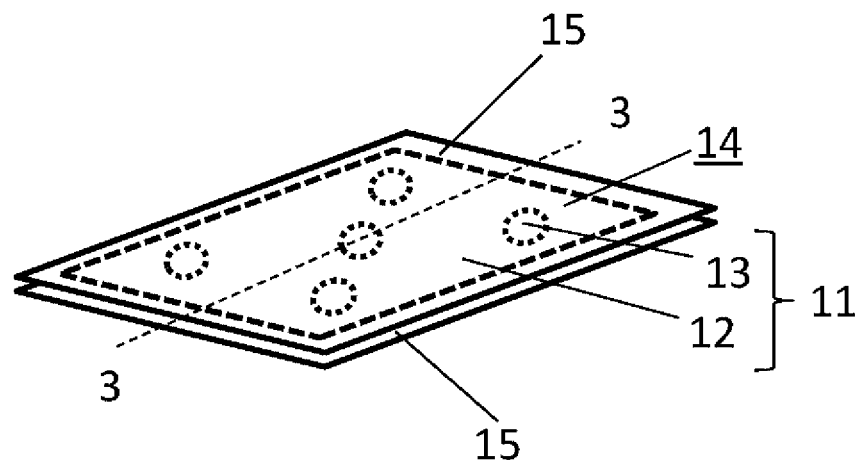
FIG. 1 is a perspective view of a heat insulating sheet according to a first exemplary embodiment of the present disclosure.
Figure 2:
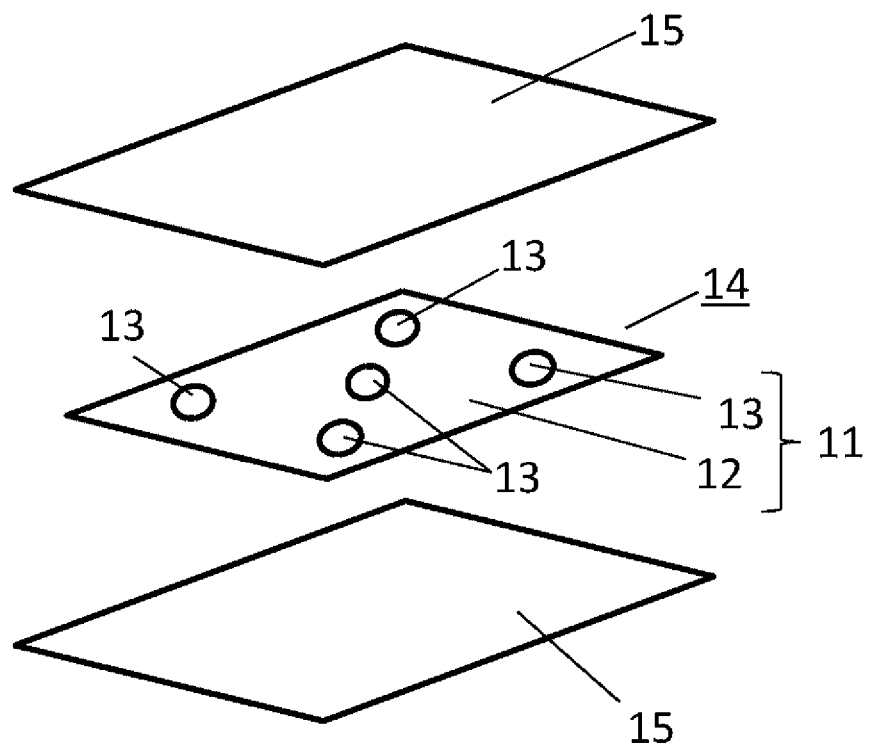
FIG. 2 is an exploded perspective view of the heat insulating sheet.
Figure 3:
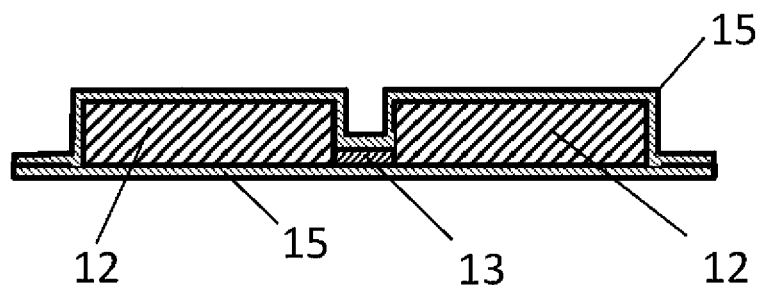
FIG. 3 is a cross-sectional view of the heat insulating sheet.

FIG. 1 is a perspective view of a heat insulating sheet according to a first exemplary embodiment of the present disclosure. FIG. 2 is an exploded perspective view of the heat insulating sheet, and FIG. 3 is a cross-sectional view of the heat insulating sheet illustrated in FIG. 1, taken along a line 3-3.

Heat insulating body 14 is configured such that in nonwoven fabric 11 made of polyethylene terephthalate (hereinafter referred to as PET) and including first region 12 having a space therein and second region 13 having no space therein, silica xerogel is carried by the space in first region 12 of nonwoven fabric 11. Silica xerogel has a nano-sized pore structure that regulates motion of air molecules. Thermal conductivity of the heat insulating body ranges from 0.018 W/m·K to 0.024 W/m·K.

Here, first region 12 is about 0.5 mm thick, and second region 13 is about 0.05 mm thick. Second region 13 has a size that a diameter thereof is about 10 mm, and is formed at a predetermined position. Second region 13 is configured such that PET constituting nonwoven fabric 11 is melted and solidified, whereby second region 13 does not have a space therein. This means that second region 13 is made of a material constituting nonwoven fabric 11. Here, having no space means that there is no space allowing entry from an outside to an inside. A space completely closed from the outside may be included.

Heat insulating body 14 has, on both sides thereof, protective sheets 15 made of PET and each having a thickness of about 0.05 mm. Each of protective sheets 15 is larger in size than heat insulating body 14. In an entire periphery of heat insulating body 14, protective sheets 15 are mutually joined by thermal fusion, and in second region 13, protective sheets 15 and second region 13 are joined by thermal fusion. With this configuration, heat insulating body 14 is sealed with protective sheets 15. Although first region 12 and protective sheets 15 are not joined, second region 13 is joined to protective sheets 15. Therefore, it is possible to prevent floating of protective sheet 15. It is also possible to form an adhesive layer on an adhering surface of protective sheet 15, and join protective sheets 15 mutually or join protective sheets 15 and second region 13 via the adhesive layer.

Note that as protective sheet 15, a fine-drawn nonwoven fabric or a nonwoven fabric in which melting resin, adhesive resin, or the like is impregnated may be used, instead of a uniform sheet made of PET.

Further, when attempting to attach the heat insulating sheet to an inside of a plastic casing, it is possible to fix protective sheet 15 to the casing by applying heat press from above the second region. To fix protective sheet 15, for the nonwoven fabric and protective sheet 15, it is desirable to use thermoplastic resin of same series, or materials having close melting points although different.

Note that second region 13 may be a through hole provided in the nonwoven fabric. With such a configuration, it is possible to seal heat insulating body 14 with protective sheets 15 by joining protective sheets 15 mutually in a periphery of the heat insulating body and in second region 13. Further, as second region 13 only has protective sheets 15, it is possible to join the heat insulating sheet to the casing or the like in this part.

Second Exemplary Embodiment

Figure 4:
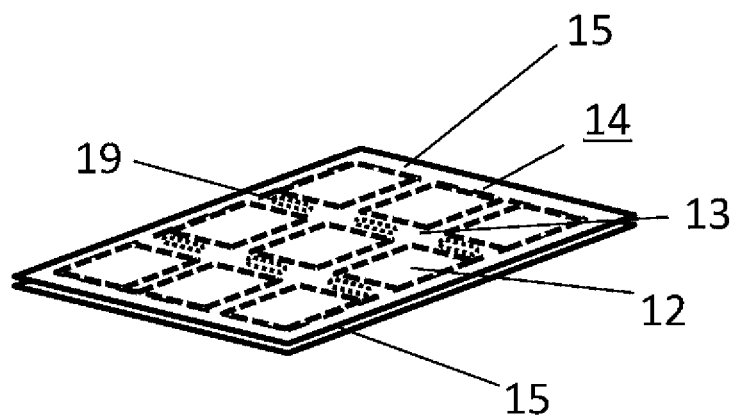
FIG. 4 is a perspective view of a heat insulating sheet according to a second exemplary embodiment of the present disclosure.
Figure 5:
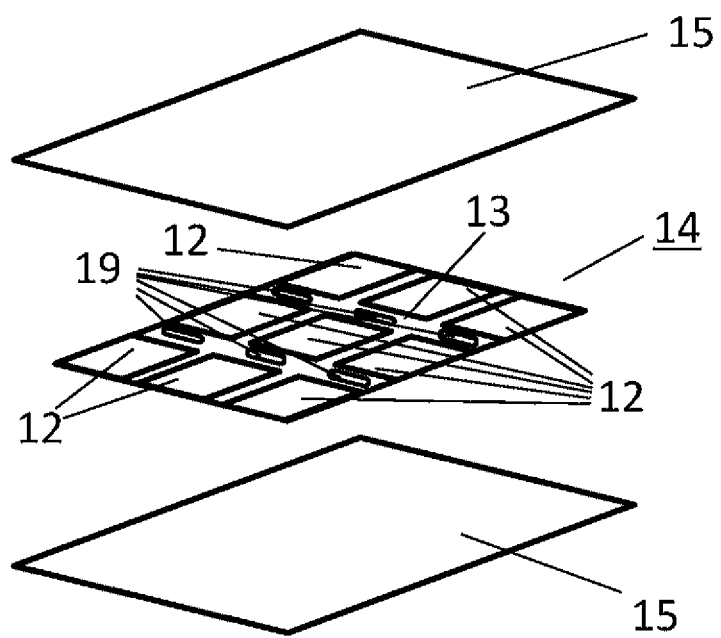
FIG. 5 is an exploded perspective view of the heat insulating sheet.

FIG. 4 is a perspective view of a heat insulating sheet according to a second exemplary embodiment of the present disclosure, and FIG. 5 is an exploded perspective view of the heat insulating sheet. The heat insulating sheet illustrated in FIG. 1 is configured such that a plurality of second regions 13 in a circular shape are formed at predetermined positions. On the other hand, the heat insulating sheet of FIG. 4 is configured such that second region 13 is formed in a lattice shape. Second region 13 is about 3 mm wide, and first region 12 is about 30 mm square large. Similar to the case of FIG. 1, heat insulating body 14 has, on both sides thereof, protective sheets 15 made of PET and each having a thickness of about 0.05 mm. Each of protective sheets 15 is larger in size than heat insulating body 14. In an entire periphery of heat insulating body 14, protective sheets 15 are mutually joined by thermal fusion, and in second region 13, protective sheets 15 and second region 13 are joined by thermal fusion. With this configuration, heat insulating body 14 is sealed with protective sheets 15. Further, a portion of second region 13 and a portion of protective sheet 15 joined thereto may have slit 19. With this configuration, when force is applied to the heat insulating sheet, the applied force is used to widen slit 19, whereby the force applied to first region 12 can be reduced. Therefore, a heat insulating sheet resistant to external force can be obtained.

Note that as a material of a nonwoven fabric, flame retardant fiber such as glass fiber may be used. In that case, a similar nonwoven fabric can be obtained by impregnating a portion forming a second region with thermoplastic resin and filling a space in the nonwoven fabric with the thermoplastic resin.

Furthermore, a nonwoven fabric may be formed of a combination of two or more types of fiber. For example, by forming a nonwoven fabric containing flame retardant fiber for equal to or more than 50% in weight ratio and containing PET for the rest, it is possible to obtain an inexpensive heat insulating sheet having high flame resistance.

Third Exemplary Embodiment

Next, a method for manufacturing the heat insulating sheet of the first exemplary embodiment of the present disclosure will be described in a third exemplary embodiment.

First, nonwoven fabric 11 made of PET and having a thickness of about 0.5 mm is prepared. A weight set to a temperature higher than a melting point of PET is pressed against nonwoven fabric 11 to thereby melt the nonwoven fabric of the pressed portion. The pressed portion is about 0.05 mm thick. While nonwoven fabric 11 originally has a space therein, a solidified portion in which PET is melted has no space. The portion having no space is referred to as second region 13, and a portion having a space is referred to as first region 12. Here, having no space means that there is no space allowing entry from an outside to an inside. A space completely closed from the outside may be included.

Nonwoven fabric 11 in which second region 13 is formed is immersed in a sol solution prepared by adding hydrochloric acid to a sodium silicate aqueous solution, to thereby impregnate the internal space of the first region with the sol solution. At that time, as second region 13 has no space allowing entry from the outside to the inside, the sol solution does not enter. The sol solution is gelatinized, hydrophobized, and dried. Thereby, the space in first region 12 is filled with silica xerogel. Through these processes, it is possible to obtain heat insulating body 14 in which the space in first region 12 is impregnated with xerogel and second region 13 only includes the material of the nonwoven fabric. On both surfaces of heat insulating body 14, protective sheets 15, larger in size than heat insulating body 14, are superposed. In the periphery of heat insulating body 14, protective sheets 15 are mutually joined by heat press, and in second region 13, protective sheets 15 and second region 13 are joined by heat press. Thereby, a heat insulating sheet is obtained.

With this configuration, heat insulating body 14 is sealed with protective sheets 15. Although first region 12 and protective sheets 15 are not joined, second region 13 is joined to protective sheets 15. Therefore, it is possible to prevent floating of protective sheet 15. Further, second region 13 does not contain silica xerogel and is only configured of the protective sheets and the material of the nonwoven fabric. Accordingly, it can be joined to a casing or the like through heat press applied from the above.

Figure 6:
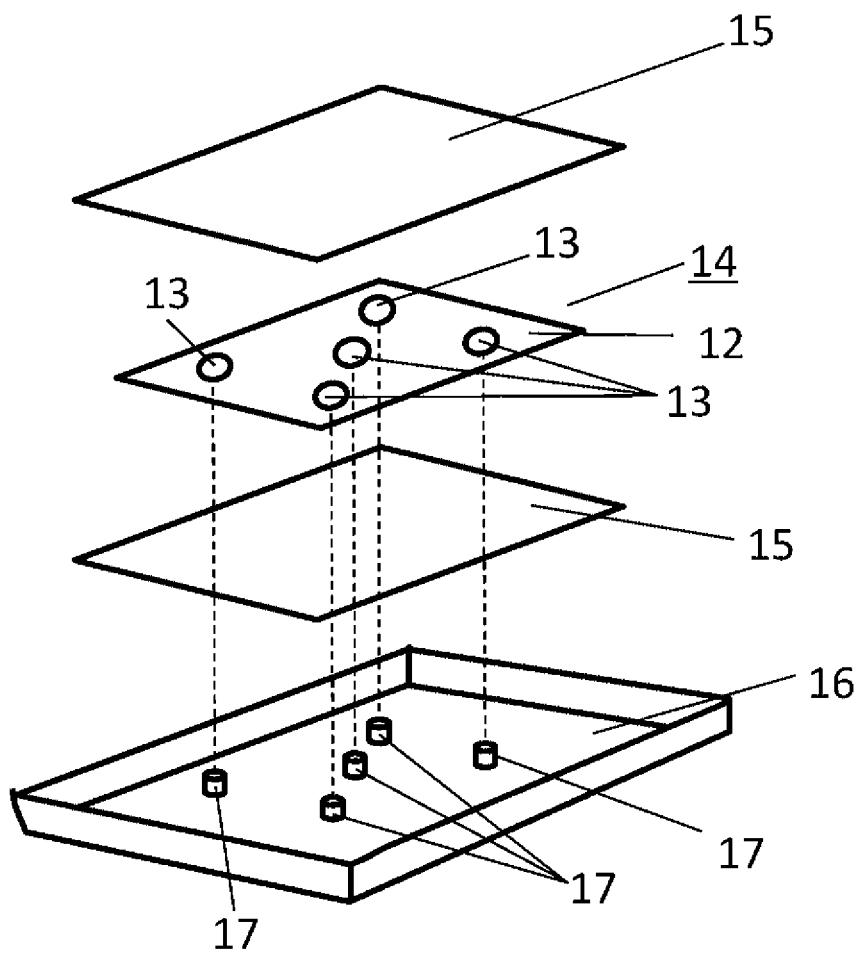
FIG. 6 is an exploded perspective view of, in a method for manufacturing a heat insulating sheet, attaching the heat insulating sheet, described in a third exemplary embodiment of the present disclosure.
Figure 7:
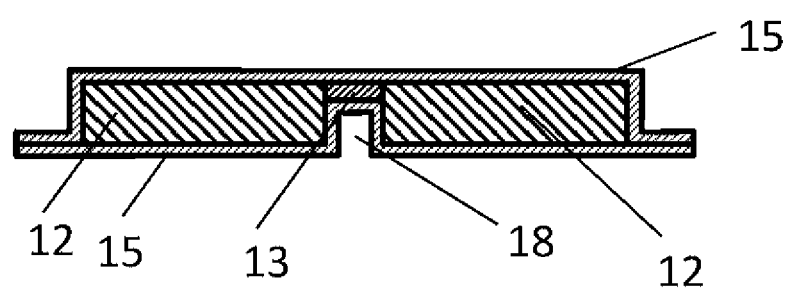
FIG. 7 is a cross-sectional view of the heat insulating sheet used in FIG. 6.

Note that in a case of applying heat press to a plastic casing, it is desirable to provide protrusion 17 in a joining portion of casing 16 as illustrated in FIG. 6. Further, as illustrated in FIG. 7, it is desirable that a heat insulating sheet has recessed portion 18 in which second region 13 on one surface is recessed from surrounding first region 12. With this configuration, protrusion 17 enters recessed portion 18, whereby positioning can be performed easily. Further, it is possible to prevent deformation of a surface opposite to the protrusion at the time of joining due to a thickness of the protrusion.

Note that as a material of the nonwoven fabric, resin having excellent incombustibility such as oxidized acrylic resin may be used. In that case, a similar nonwoven fabric can be obtained by superposing a thermoplastic resin sheet on a portion forming second region 13 and applying heat press, or impregnating a portion forming the second region with melted thermoplastic resin and filling a space in the nonwoven fabric with the thermoplastic resin.

Further, the size and thickness of the heat insulating sheet shown in the present disclosure are examples. The size and thickness of the heat insulating sheet may have various values according to uses. Furthermore, the thickness and size of nonwoven fabric 11, first region 12, and second region 13 are not limited to the values described above, and may have various values.

A heat insulating sheet and a method for manufacturing the same according to the present disclosure can provide a heat insulating sheet that is easily attachable, and are useful in industry.

The invention claimed is:

1. A heat insulating sheet comprising:
a heat insulating body having a first surface and a second surface opposite to the first surface; and
a first protective sheet disposed on the first surface of the heat insulating body; and
a second protective sheet disposed on the second surface of the heat insulating body, wherein:
the heat insulating body comprises a nonwoven fabric and xerogel,
the nonwoven fabric is made of flame retardant fibers,
the heat insulating body includes:
 a first region impregnated with the xerogel and carrying no thermoplastic resin; and
 a second region impregnated with a thermoplastic resin and carrying no xerogel, the second region is provided inside an outer periphery of the heat insulating body,
the heat insulating sheet comprises a peripheral region provided outside the outer periphery of the heat insulating body, the peripheral region not containing the thermoplastic resin with which the second region has been impregnated and carrying no xerogel,
in the second region, each of the first and second protective sheets are joined, and in the first region, the first and second protective sheets are not joined to the first region,
a recessed portion is provided in the second region,
in the peripheral region, the first and second protective sheets are joined each other,
in an area of the first protective sheet corresponding to the first and second regions, a surface of the first protective sheet is entirely flat, and
in an area of the second protective sheet corresponding to the first and peripheral regions, a surface of the second protective sheet is entirely flat.

2. The heat insulating sheet according to claim 1, wherein the second region is in a lattice shape.

3. The heat insulating sheet according to claim 1, wherein a plurality of the second regions are arranged in a scattered manner.

4. The heat insulating sheet according to claim 2, wherein each of a portion of the second region and a portion of at least one of the first and second protective sheets joined to the second region has a slit.

5. The heat insulating sheet according to claim 1, wherein the flame retardant fibers are glass fibers.

6. The heat insulating sheet according to claim 1, wherein a thickness of the heat insulating body at the second region is smaller than a thickness of the heat insulating body at the first region.

* * * * *